United States Patent [19]
Egan et al.

[11] Patent Number: 5,337,608
[45] Date of Patent: Aug. 16, 1994

[54] DRIVE ROLLER TORQUE REFERENCE CARTRIDGE

[75] Inventors: Daniel Egan, St. Paul; Jerry Alexander, St. Paul Park; James T. McKinney, Stillwater; John F. Runyon, St. Paul, all of Minn.

[73] Assignee: Minnesota Mining and Manufacturing Company, St Paul, Minn.

[21] Appl. No.: 993,101

[22] Filed: Dec. 18, 1992

[51] Int. Cl.⁵ .............................................. G01L 25/00
[52] U.S. Cl. .................................................... 73/865.6
[58] Field of Search .............. 73/1 B, 1 C, 865.9, 73/865.6; 188/267; 310/93, 103, 106

[56] References Cited

U.S. PATENT DOCUMENTS

| | | | |
|---|---|---|---|
| 2,741,714 | 4/1956 | Regelman | 310/93 |
| 2,807,734 | 9/1957 | Lehde | 310/103 |
| 3,416,749 | 12/1968 | O'Neill | 310/93 |
| 3,417,937 | 12/1968 | Van Slageren . | |
| 3,692,255 | 9/1972 | VonBehren . | |
| 4,255,098 | 9/1980 | Henkler et al. . | |
| 4,761,989 | 8/1988 | McDevitt | 73/1 C |
| 4,801,853 | 1/1989 | Lewis et al. . | |
| 4,832,283 | 5/1989 | Treff et al. . | |

FOREIGN PATENT DOCUMENTS 3-94685  9/1991  Japan .

*Primary Examiner*—Robert Raevis
*Attorney, Agent, or Firm*—Gary L. Griswold; Walter N. Kirn; Eric D. Levinson

[57] ABSTRACT

A drive roller torque reference cartridge for calibrating a drive force tester. The reference cartridge uses a magnetic hysteresis brake assembly to controllably resist the rotation of the cartridge drive roller. The magnetic hysteresis brake assembly includes a cylindrical permanent magnet within the drive roller and a coaxial remanently magnetizable sleeve surrounding the drive roller. The drag created by the reference cartridge is substantially independent of the temperature and rotational speed of the drive roller.

14 Claims, 2 Drawing Sheets

DRIVE ROLLER TORQUE REFERENCE CARTRIDGE

FIELD OF INVENTION

The present invention relates generally to data cartridges, and in particular, to the drive rollers used therein.

BACKGROUND OF THE INVENTION

The belt driven data tape cartridge of Von Behren, U.S. Pat. No. 3,692,255, has become a standard interface with computers where streaming and other off-line data back-up operations require rapid acceleration and deceleration of the tape. In these tape cartridges, a belt is driven by a drive roller along a belt path which includes a portion of the peripheries of the drive roller, a supply spool, a take-up spool, and two corner guide rollers positioned adjacent the tape spools, thereby reversibly driving the tape from spool to spool. A tape path extends between the spools and along one edge of the cartridge at which access to the tape and drive roller is provided.

The drive roller in the cartridge is externally driven by a drive puck in a cartridge drive, the periphery of which circumferentially contacts the periphery of the drive roller. The torque on the drive roller exerted by the cartridge drive's drive puck is a crucial operating parameter of a data cartridge. In order to assess the torque being applied, a data tape cartridge having a known desired internal resistance or "drag" can be inserted into a cartridge tester. Westlake Technology Corporation of Westlake Village, Calif., sells such cartridges and testers. The Westlake cartridge provides a drag by generating eddy currents within a rotating aluminum disk. This design is undesirable because the drag it provides is dependent on the temperature and speed of rotation of the aluminum disk. Furthermore, the aluminum disk protrudes out of the cartridge, thereby preventing insertion of the cartridge into a cartridge tester that has not been especially adapted to receive the cartridge. Furthermore, in the Westlake system, if the drive force measured by the cartridge tester for the verification cartridge does not match the actual drive force indicated on the verification cartridge, the entire cartridge tester must be returned to Westlake for re-calibration.

SUMMARY OF THE INVENTION

Accordingly, the present invention is directed to a reference cartridge that establishes a pre-determined drive force. The reference cartridge is configured to fit into a standard cartridge drive, and thus can be used in cartridge testers that have not been especially adapted to receive the cartridge. The reference cartridge provides a drag that is virtually independent of the temperature and rotational speed of the drive roller and is relatively constant over the life of the cartridge. The cartridge includes a magnetic hysteresis brake assembly for controllably resisting the rotation of a drive roller in the cartridge, thereby imparting a controlled torque on the drive roller.

The entire magnetic hysteresis brake assembly preferably fits within the reference cartridge. The magnetic hysteresis brake assembly can include a cylindrical permanent magnet within the drive roller. The magnet can include at least two angularly spaced regions around its circumference that are radially magnetized in opposite directions.

The magnetic hysteresis brake assembly can further include a remanently magnetizable cylindrical sleeve which surrounds the cylindrical permanent magnet and is fixed to the cartridge base plate, thereby allowing the drive roller and cylindrical magnet to be rotated within it. The remanently magnetizable cylindrical sleeve can include several coaxial rings stacked on top of each other.

BRIEF DESCRIPTION OF THE DRAWINGS

The novel features and advantages of the present invention will become more apparent to those skilled in the art upon consideration of the following detailed description which refers to the accompanying drawings, wherein.

DETAILED DESCRIPTION

Figure 1:
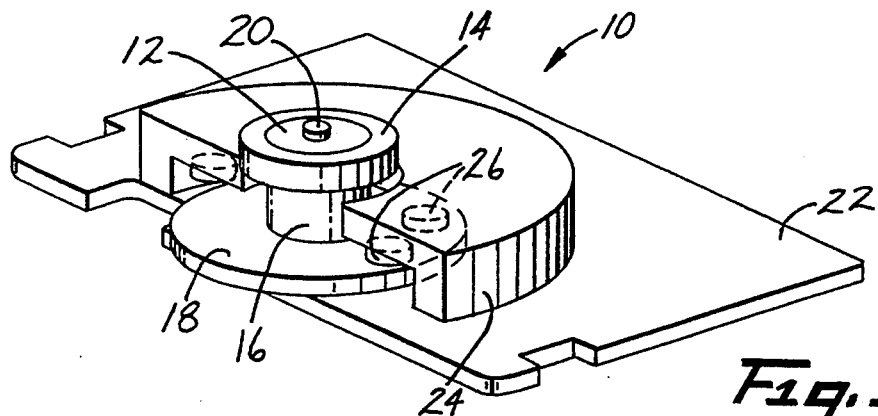
FIG. 1 is a perspective view of a prior art reference cartridge.

A prior art verification cartridge 10 manufactured by Westlake Technology Corporation is shown in FIG. 1. The verification cartridge 10 includes a drive roller 12 which has a large outer-diameter portion 14 adapted to contact a drive puck in a cartridge drive (not shown). The drive roller 12 also includes a shaft 16 which is secured to an aluminum disk 18. The drive roller 12 and the aluminum disk 18 are mounted for rotation about a pivot pin 20 which is secured to a base plate 22 of the cartridge 10. A magnet housing 24 is secured to the base plate 22 and overhangs a portion of the aluminum disk 18. Five circular magnets 26 are suspended from the housing 24 over the aluminum disk 18. The magnets 26 are magnetized along a direction perpendicular to their diameters.

When the prior art cartridge 10 is inserted into a cartridge drive tester, the tester's drive puck (not shown) contacts the periphery of the large outer diameter 14 of the drive roller 12. The drive puck rotates the drive roller 12, and therefore also rotates the aluminum disk 18, around the pivot pin 20. As the aluminum disk 18 is rotated past the fixed magnets 26, circulating currents, also known as eddy currents, are created in the aluminum disk. As a sector of the aluminum disk 18 enters the magnetic field provided by each magnet 26, the change in magnetic flux creates an induced electric voltage in the aluminum disk, which causes electric current to flow in the aluminum disk. These eddy currents contribute to slowing the rotational speed of the aluminum disk 18, and therefore the drive roller 12, because, according to Lenz's law, the eddy currents must flow in a direction opposite to the direction of the change that created them. These eddy currents produce effective magnetic poles on the aluminum disk 18 which are repelled by the poles of the magnets 26, resulting in a drag on the rotation of the aluminum disk, and thus on the drive roller 12.

The magnitude of the rotational drag produced by the aluminum disk 18 in the prior art cartridge 10 depends on the speed of rotation of the disk. The faster the drive roller 12 (and therefore the aluminum disk 18) is rotated, the greater the rotational drag. This dependency on speed is undesirable as cartridge drives are designed to operate at various speeds during read/write and rewind/fast forward operations.

The magnitude of the rotational drag produced by the aluminum disk 18 is also dependent on the temperature of the disk. The energy produced by the drag caused by the rotation of the aluminum disk 18 past the magnets 26 results in the generation of heat in the aluminum disk. A change in the temperature of the aluminum disk 18 causes a change in the electrical resistivity of the disk, which in turn affects the magnitude of the eddy currents, which affects the amount of the rotational drag.

Another disadvantage of this design is that the aluminum disk 18 must be fairly large in order to be able to carry the magnitude of eddy currents required to generate sufficient drag without causing the disk to overheat. As a result, the aluminum disk 18 protrudes out of the cartridge 10, thereby preventing insertion of the cartridge into a cartridge drive tester that has not been especially adapted to receive the cartridge.

Figure 2:
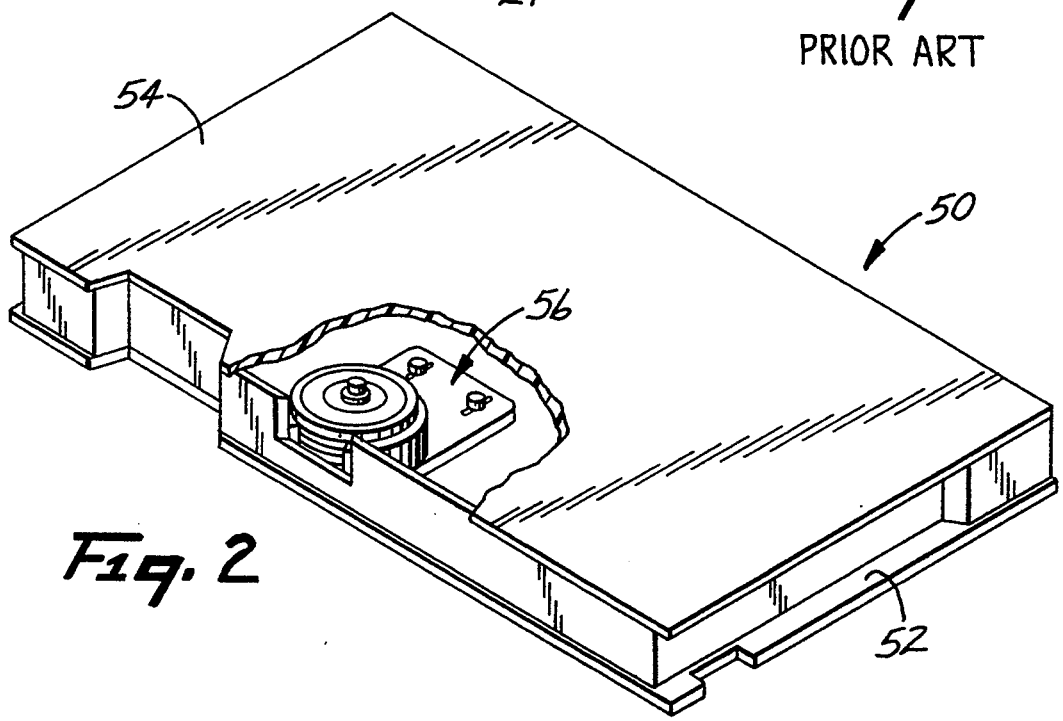
FIG. 2 is a perspective view of a reference cartridge according to one embodiment of the present invention.

A drive roller torque reference cartridge 50 for establishing a predetermined drive force according to the present invention is shown in FIG. 2. The reference cartridge 50 can be either a 5.25 inch (13.3 cm) form factor standard size data cartridge, a 3.5 inch (8.9 cm) form factor mini-size data cartridge, or any other size data cartridge. The cartridge 50 includes a base plate 52, an outer casing 54, and a magnetic hysteresis brake assembly 56. The reference cartridge 50 preferably contains no magnetic tape, no drive belt, no tape spools, and no corner guide rollers, as would be present in an operable data cartridge.

Figure 3:
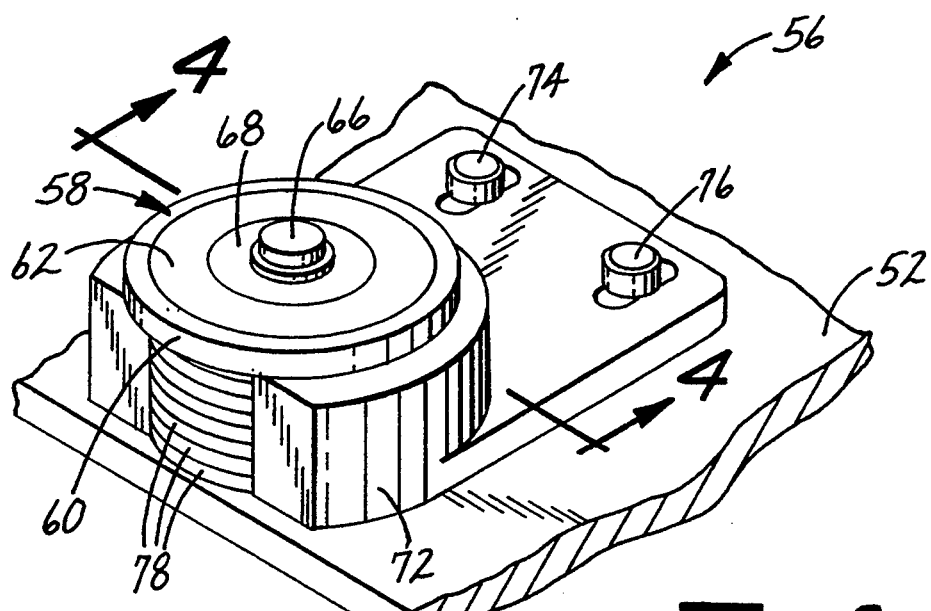
FIG. 3 is a perspective view of a magnetic hysteresis brake assembly according to one embodiment of the present invention.
Figure 4:
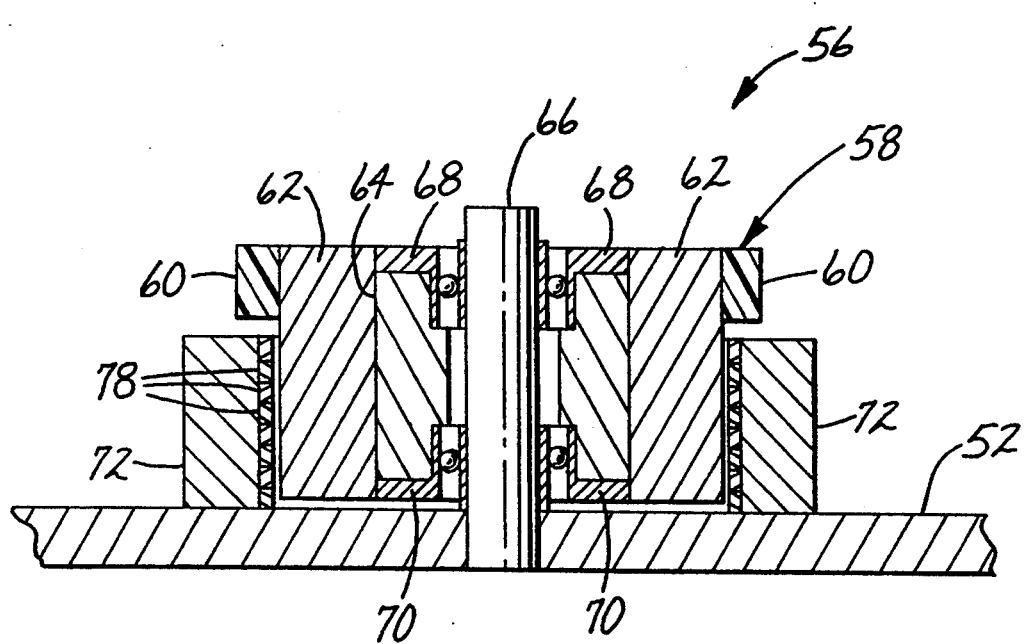
FIG. 4 is a cross-sectional view of FIG. 3.

The magnetic hysteresis brake assembly 56 is shown in detail in FIGS. 3 and 4. The magnetic hysteresis brake assembly 56 includes a drive roller 58, a remanently magnetizable cylindrical sleeve 78, and a non-magnetic base 72. The drive roller 58 has a large outer diameter portion 60 which is adapted to contact a drive puck in a cartridge drive (not shown), when the cartridge is inserted therein. The drive roller 58 also has a cylindrical permanent magnet 62 within the outer-diameter portion 60, which is co-axial with the drive roller. An annular steel insert 64 is provided within a recess in the magnet 62.

The steel insert 64 of the drive roller 58 is configured to rotate about a pivot pin 66 mounted in the base plate 52, as shown in FIG. 4. The steel insert 64 supports ball bearing bushings 68 and 70 positioned toward the top and bottom, respectively, of the drive roller 58.

The non-magnetic base 72 can be made of non-magnetic stainless steel, such as series 304 stainless steel. The non-magnetic base 72 is mounted to the base plate with screws 74 and 76. The non-magnetic base 72 surrounds about 80% of the drive roller 58 and is completely contained within the outer casing 54 of the cartridge 50. The remanently magnetizable cylindrical sleeve 78 is positioned within the non-magnetic base 72 and is coaxial with the drive roller 58. The inner diameter of the cylindrical sleeve 78 is slightly larger than the outer diameter of the cylindrical magnet 62 so that the cylindrical magnet, and thus the drive roller 58, can rotate with respect to the cylindrical sleeve while the sleeve remains secured to the non-magnetic base 72.

Figure 5:
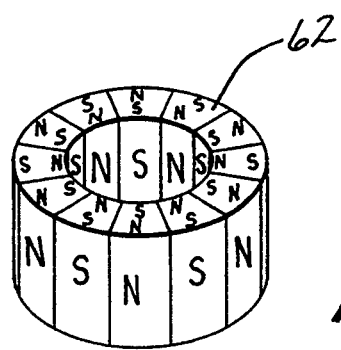
FIG. 5 is a perspective view of a cylindrical magnet according to one embodiment of the present invention.

The cylindrical magnet 62 is preferably made of neodymium or barium ferrite and should have a magnetic energy product of at least about 10 Megagauss-oersteds, and more preferably about 20 Megagauss-oersteds. Such magnets can be obtained from Dynacast Corp., Seneca, S.C. The cylindrical magnet 62 includes at least two angularly spaced regions around its circumference wherein each region is radially magnetized in a direction opposite to the direction of magnetization of its adjacent regions. The cylindrical magnet 62 preferably includes at least four such regions, more preferably at least six, and most preferably about twelve such regions spaced around the circumference of the cylindrical magnet, as shown in FIG. 5. The number of angularly spaced regions is preferably an even number.

The cylindrical sleeve 78 is preferably made of Vicalloy I steel (10% V, 52% Co, and the balance Fe), treated to have a coercive force of about 230 oersteds, or Chromindur II steel (28% Cr, 10% Co, and the balance Fe). The cylindrical sleeve 78 can be comprised of a plurality of stacked tings. Eight such rings are shown in FIG. 4. The use of a plurality of tings to form the sleeve 78 is desirable because the height of the sleeve can be easily selected by adding or subtracting rings. The taller the sleeve selected, the greater the drag generated by the magnetic hysteresis brake assembly 56. Thus the desired drag can be achieved by selecting the appropriate number of rings to form the sleeve 78 without the expense of having to redesign the sleeve. It is also believed that the stack of separate rings minimizes the formation of eddy currents within the sleeve 78, thereby ensuring that the drag is speed independent.

The steel insert 64 provides a more efficient magnetic flux path between the opposite magnetic poles of adjacent regions around the inner periphery of the cylindrical magnet 62. This may serve to minimize the formation of eddy currents within the pivot pin 66.

When the cartridge 50 is inserted into a cartridge drive tester, the tester's drive puck engages the large outer diameter portion 60 of the drive roller 58, and rotates the drive roller with respect to the pivot pin 66, and thus rotates the cylindrical magnet 62 with respect to the cylindrical sleeve 78.

The cylindrical magnet 62 should be separated from the cylindrical sleeve 78 by a distance that is small enough to allow each region of the cylindrical magnet to sufficiently saturate that portion of the cylindrical sleeve opposite it before the next region, having an opposite direction of magnetization, moves into place opposite that same portion of the cylindrical sleeve. In order to magnetize a portion of the cylindrical sleeve 78, work must be done, i.e., energy expended, by the regions of the cylindrical magnet 62 in order to align that portion of the cylindrical sleeve in a given direction. And once that portion of the cylindrical sleeve 78 has been magnetized in one direction, the next region of the cylindrical magnet 62 passes in front of that portion of the cylindrical sleeve, and because the next region has its direction of magnetization oriented opposite to its adjacent regions, the direction of magnetization of that portion of the cylindrical sleeve is reversed, which again requires the cylindrical magnet to do more work, i.e., expend more energy. This loss of energy due to the cyclic magnetization is known as magnetic hysteresis loss.

It is generally recognized that the area of the hysteresis loop of a magnetizable material defines the energy dissipated each time the magnetization in the material is made to traverse completely around the hysteresis loop. Thus, in the present invention, the area of the loop of the material selected for the cylindrical sleeve 78 and the number of poles on the cylindrical magnet 62 determine the amount of energy dissipated during each full revolution of the drive roller 58. This energy dissipation per revolution in turn determines the hysteresis drag torque generated by the drive roller. As long as the remanently magnetizable cylindrical sleeve 78 is operating in a mode of magnetic saturation, two parameters primarily control the area of the hysteresis loop, first, the volume of the cylindrical sleeve itself and, second, the magnetic properties of the sleeve.

Thus, the amount of the energy lost, and therefore the amount of drag created by the magnetic hysteresis brake assembly, is independent of the speed of rotation of the drive roller 58. Experimentally, the drag generated by the magnetic hysteresis brake assembly 56 of the present invention has been found to vary by less than 2% for variations in the rotational speed of the drive roller 58 ranging from 11 to 43 revolutions per second.

The energy that is "lost" due to the magnetic hysteresis brake assembly 56 is transformed into heat, which is dumped, via the non-magnetic base 72, into the base plate 52, where the heat is dissipated. Thus, the drag caused by the magnetic hysteresis brake assembly 56 in the cartridge 50 is virtually unaffected by changes in temperature. Experimentally, the drag generated by the magnetic hysteresis brake assembly of the present invention has been found to vary by less than 1% over temperatures ranging from 25° C. to 35° C.

In contrast, in the prior art cartridge 10, the heat is dumped into the much smaller aluminum disk 18, thus raising the temperature of the disk, thereby affecting the electrical resistivity of the disk. And because the design of the prior art cartridge 10 relies on the generation of eddy currents within the aluminum disk 18, the change in electrical resistivity changes the magnitude of the current flow, which changes the amount of the rotational drag.

A further advantage of the magnetic hysteresis brake assembly of the cartridge 50 is that it is capable of providing a relatively high drag over a relatively small radius. Thus the entire magnetic hysteresis brake assembly 56 can fit into a standard drive roller and a small area around the drive roller, and thus can be completely contained within the cartridge casing 54. Thus, the reference cartridge 50 can fit into and be used to evaluate all cartridge drive testers. In contrast, the prior art cartridge 10 cannot be used on a drive tester unless the tester has been especially configured to receive it, since the aluminum disk 18 protrudes from the base plate 22.

The ball bearing bushings 68 and 70 positioned between the steel insert 64 of the drive roller 58 and the pivot pin 66 serve to minimize the torque generated by frictional drag between the drive roller and the pivot pin. The use of the ball bearing bushings 68 and 70 instead of a journal bearing ensures that substantially all of the torque exerted by the rotating drive roller 58 is provided by the magnetic hysteresis brake assembly 56. It is believed that 98% of the total drag is caused by the magnetic hysteresis brake assembly. This is desirable because the drag generated by the magnetic hysteresis brake assembly is substantially unaffected by changes in temperature and rotational speed of the drive roller. Frictional drag, in contrast, can be affected by these variables. The use of the ball bearing bushings 68 and 70 also prolongs the useful life of the reference cartridge 50 by reducing wear between the drive roller 58 and the pivot pin 66.

The cartridge 50 of the present invention having a known drag can be used to verify the drive force calibration of a drive tester by inserting the cartridge into the tester. The cartridge 50 can also be used to calibrate or establish correction factors for a drive tester by using two or more such cartridges having different drag values. This allows the purchaser of the reference cartridges to calibrate or establish correction factors for his drive tester himself without having to return the drive tester to its manufacturer for calibration.

The present invention will now be further described with regard to the following non-limiting example. The magnetic hysteresis brake assembly 56 having the drive roller having the dimensions described in the Example below can be used in a mini-reference cartridge, even though such mini-cartridges typically employ a smaller drive roller.

EXAMPLE

A drive roller torque reference cartridge as shown in FIG. 2, and having a 5.25 inch form factor was constructed having a magnetic hysteresis brake assembly 56 as shown in FIGS. 3 and 4. The large outer diameter portion 60 of the drive roller 58 had a diameter of 890 mils (23 mm). The cylindrical magnet 62 had an outer diameter of 755 mils (19 ram) and was made of neodymium having a magnetic energy product of 20 Megagauss-oersteds. The cylindrical sleeve 78 was comprised of eight rings of Vicalloy I having a radial thickness of 20 mils (0.51 ram). The inner diameter of the cylindrical sleeve 78 was separated from the outer diameter of the cylindrical magnet 62 by about 8 mils (0.20 mm).

The rotational speed of the drive roller 58 was varied from 11 to 43 revolutions per second. These rotational speeds correspond to linear speeds of 23 to 91 inches/second (58 to 231 cm/sec) for a magnetic tape in a 5.25 inch form factor cartridge. Within this range of rotational speeds, the drag provided by the magnetic hysteresis brake assembly 56 varied from 3.585 ounces to 3,622 ounces, a variation of only 1%.

The temperature of the reference cartridge was also varied from 25° C. to 35° C. Over this range, the drag provided by the magnetic hysteresis brake assembly 56 varied from 3.599 to 3.609 ounces, a variation of only 0.3%.

We claim:

1. A reference cartridge for establishing a pre-determined drive force, the reference cartridge including an outer casing mounted over a base plate, a drive roller mounted for rotation about a pivot pin secured to the base plate, and a magnetic hysteresis brake assembly for controllably resisting rotation of the drive roller, thereby imparting a controlled torque on the drive roller, wherein the magnetic hysteresis brake assembly fits within the outer casings, whereby the cartridge is configured for insertion into a standard cartridge drive.

2. The reference cartridge of claim 1, wherein substantially all of the torque exerted on the rotating drive roller is imparted by the magnetic hysteresis brake assembly, whereby the torque exerted on the drive roller is substantially independent of temperature and speed of rotation.

3. The reference cartridge of claim 2, wherein the torque exerted on the rotating drive roller varies by less than about 2% over a range of rotational speeds from about 11 to 43 revolutions per second.

4. The reference cartridge of claim 2, wherein the torque exerted on the rotating drive roller varies by less than about 1% over a temperature range of 25° to 35° C.

5. The reference cartridge of claim 2, further including first and second ball beating bushings positioned between the drive roller and the pivot pin, thereby minimizing torque generated by frictional drag between the roller and pin.

6. The reference cartridge of claim 1, further including a cylindrical permanent magnet within the drive roller, the magnet being coaxial with the axis of rotation of the drive roller.

7. The reference cartridge of claim 6, wherein the cylindrical permanent magnet includes at least two angularly spaced regions around its circumference, each region being radially magnetized, wherein each region is magnetized in a direction opposite to the direction of magnetization of its adjacent regions.

8. The reference cartridge of claim 7, wherein the cylindrical permanent magnet includes at least six angularly spaced regions.

9. The reference cartridge of claim 6, wherein the magnetic hysteresis brake assembly further includes a remanently magnetizable cylindrical sleeve which is fixed to the base plate, the sleeve being coaxial with the axis of rotation of the drive roller, wherein the diameter of the sleeve is slightly greater than the diameter of the magnet, and wherein the magnet is positioned within the sleeve, whereby the cylindrical magnet can be rotated within the sleeve while the sleeve remains fixed to the base plate.

10. The reference cartridge of claim 9, wherein the sleeve fits within a non-magnetic base that is secured to the base plate.

11. The reference cartridge of claim 9, wherein sleeve is comprised of a plurality of rings of the same diameter as the sleeve, the rings being coaxial with the sleeve, wherein the rings are stacked on top of each other.

12. The reference cartridge of claim 9, wherein the remanently magnetizable cylindrical sleeve comprises vicalloy or chromindur steel.

13. The reference cartridge of claim 6, wherein the cylindrical permanent magnet has a magnetic energy product of at least about 10 Megagauss-oersteds.

14. A reference cartridge for establishing a pre-determined drive force, including a drive roller mounted about a pivot pin secured to a base plate, a magnetic hysteresis brake assembly for controllably resisting rotation of the drive roller, thereby imparting a controlled torque on the drive roller, the magnetic hysteresis brake including a cylindrical permanent magnet within the drive roller coaxial with the axis of rotation of the drive roller and a remanently magnetizable cylindrical sleeve fixed to the base plate, the sleeve comprised of a plurality of rings of the same diameter as the sleeve, the rings being coaxial with the sleeve, wherein the rings are stacked on top of each other, wherein the sleeve is coaxial with the axis of rotation of the drive roller, wherein the diameter of the sleeve is slightly greater than the diameter of the magnet, and wherein the magnet is positioned within the sleeve, whereby the cylindrical magnet can be rotated within the sleeve while the sleeve remains fixed to the base plate.

* * * * *

UNITED STATES PATENT AND TRADEMARK OFFICE
CERTIFICATE OF CORRECTION

PATENT NO. : 5,337,608
DATED : August 16, 1994
INVENTOR(S) : Egan et al.

It is certified that error appears in the above-indentified patent and that said Letters Patent is hereby corrected as shown below:

```
Column 4, line 21, "tings" should read --rings--.
Column 4, line 22, "tings" should read --rings--.
Column 6, line 28, "(19 ram)" should read --(19 mm)--.
Column 6, line 32, "(0.51 ram)" should read --(0.51 mm)--.
Column 6, line 42, "3,622" should read --3.622--.
Column 7, line 5, "beating" should read --bearing--.
```

Signed and Sealed this

Twenty-second Day of November, 1994

Attest:

BRUCE LEHMAN

*Attesting Officer*  Commissioner of Patents and Trademarks